United States Patent [19]
Berkovskaya et al.
[11] 3,781,553
[45] Dec. 25, 1973

[54] APPARATUS FOR ANALYZING AN IMAGE

[76] Inventors: Karina Fridrikhovna Berkovskaya, Prospekt M. Toreza, 18, kv. 120; Nina Vitalievna Lapteva, Karbysheva 6 Korpus 1, kv. 278; Boris Georgievich Podlaskin, Prospekt Smirnova 15, kv. 34, all of Leningrad, U.S.S.R.

[22] Filed: Nov. 28, 1972

[21] Appl. No.: 310,076

[52] U.S. Cl. .......... 250/553, 250/211 J, 250/219 D, 340/173 LS

[51] Int. Cl. .......... H01j 39/12

[58] Field of Search .......... 340/173 LM, 173 LS, 340/173 LT; 250/220 M, 211 R, 211 J, 219 D; 317/235 N; 350/160 R, 160 SF

[56] References Cited

UNITED STATES PATENTS

| | | | |
|---|---|---|---|
| 3,488,636 | 1/1970 | Dyck | 340/173 LS |
| 3,551,761 | 12/1970 | Ruoff | 317/235 |
| 3,656,120 | 4/1972 | Maure | 250/220 M |
| 3,689,900 | 9/1972 | Chen | 340/173 |

*Primary Examiner*—James W. Lawrence
*Assistant Examiner*—D. C. Nelms
*Attorney*—Eric H. Waters et al.

[57] ABSTRACT

The apparatus converts an image into a set of coefficients of Fourier series by systems of two-dimensional functions.

The apparatus includes means for optical reproduction of the image being analyzed, the light radiated by the means being masked in accordance with a law expressed as a set of two-dimensional functions. The radiated light is received by a matrix of photosensitive cells connected at the intersections of a system of orthogonal buses. During an anlysis, a voltage generator connected to the buses feeds thereto a voltage pattern to render the photo sensitive cells light-responsive and light-irresponsive in groups distributed in space over the area of the matrix in accordance with a successive one of the given set of two-dimensional functions. Thus, the matrix performs at the same time both the masking and registration of the masked light flux.

The sum total of the absolute values of the electric currents through the photocells becomes proportional to the integrated light flux of the image field, and thus corresponds to a coefficient representative of the shape of the image.

6 Claims, 11 Drawing Figures

APPARATUS FOR ANALYZING AN IMAGE

The present invention relates to improvements in apparatus for analyzing the shape of an image, based on conversion of the shape of the image into a set of coefficients belonging to a Fourier series, in accordance with a system of two-dimensional functions; the invention can be employed, e.g., for image identification, for evolving an image against a background noise, for encoding, for photometry.

It is known that every image can be presented as a Fourier series of which the coefficients are unambiguously representative of the image and form a spatial frequency spectrum of the image.

It is a common practice to employ as a complete orthogonal set of functions by which expansion into the Fourier series is effected such functions as sinusoidal and co-sinusoidal. However, Tchebyshev polynom, Walsh and Bessel functions and any other complete set of orthogonal functions may be also employed. Operations performed on frequency spectra, unlike operations performed on the image itself, open up wide possibilities of converting the image, comparing either the complete image or a part thereof with standard or reference images, removing unwanted portions of the image, identifying it.

It is also a common practice to expand an optical image into a Fourier series by orthogonal functions for subsequent analysis by means of mechanical modulation of the image with the help of masks of which the geometrical image corresponds to the abovesaid functions. Determination of Fourier coefficients is also possible with the use of combined electronic-optical devices for analyzing the shape of an image.

There is widely known, for instance, an apparatus comprising means for optical reproduction of the image being analyzed, including an illumination source sending through a lens a flux of parallel light rays passing through a diaphragm limiting the image field. There is mounted behind the diaphragm a film containing the image being analyzed and a film with a set of optical masks introduced in succession into the image field, each such mask being a combination of transparent and opaque areas, the group distribution thereof corresponding to the law expressed by a system of two-dimensional functions. These matrices are introduced into the image field by a mechanical means.

The light flux that has passed through the image and through the mask is collected by a lens and directed upon a photoreceiver. Depending on which one of the Fourier series coefficients is to be obtained for the purposes of the analysis of the image, the respective mask from the above-described set is introduced into the image field. As the image is thus sequentially masked in accordance with the given law, there is generated at the output of the photo-receiver a timed sequence of electric signals proportional to the integral values of the light fluxes of the entire image field, that have passed through the mask, and, therefore, proportional to the coefficients of the Fourier's series. The output signals of the receiver can be sent for further processing, e.g., into a computer.

A considerable disadvantage of the abovespecified known apparatus is the limited speed of mask changing, resulting from the presence of a mechanical driving means.

Besides, the set of the masks is permanently recorded on a given film and cannot be varied, which brings down the speed of the apparatus, when it is necessary either to shift from decomposition of the image in accordance with one system of functions to another system of functions, or else to vary the sequential order of presentation of the masks.

Still another disadvantage of the abovespecified apparatus arises from the fact that when the masks are changed mechanically, accurate positioning of a mask in the image field presents a serious problem. And, finally, among the disadvantages of the known apparatus are its relatively great dimensions.

There is also known an apparatus that does away with the masking operation. In this apparatus the image is decomposed into a dot screen one and scanned, dot after dot, in which way a timed sequence of electric signals is obtained, corresponding to the degree of illumination of the respective areas in the image field. The signals are introduced into a computer where, by using "fast" algorithms, there are developed the coefficients of a Fourier's series, which are unambiguously representative of the image being analyzed. The time T needed for developing these coefficients of the Fourier series is defined by the number of the dots in a screen and is proportional to that number, viz. T ~ NM lg NM, where NM is the number of dots of the screen. When the number of the dots is sufficiently great, the processing time amounts to several minutes, which is not always permissible.

It is an object of the present invention to speed up the image analyzing operation.

It is another object of the present invention to increase the rate of mask changing, when decomposition is effected in accordance with one of a given set of functions.

It is still another object of the present invention to increase the rate of mask changing, when it is necessary to shift from decomposition of an image for analysis in accordance with one system of functions to decomposition of the same image in accordance with a different system of functions.

And, finally, it is an object of the present invention to do away with adjusting steps at mask changing and to reduce the size of the apparatus, as a whole.

These and other objects are attained in an apparatus for analyzing the shape of an image, comprising means for optical reproduction of an image being analyzed, the light radiated by said means being masked at given moments in accordance with a given law expressed as a set of two-dimensional functions, so as to isolate the radiation corresponding to different areas of said image at different moments, and a receiving means adapted to register this masked radiation and to convert it into timed sequence of electric pulses proportional to the integral values of the light fluxes of the image field, corresponding to each said two-dimensional function, said pulses carrying information representative of the shape of said image, in which apparatus, in accordance with the present invention, said receiving means includes a matrix of photosensitive cells situated in said image field, said photosensitive cells, upon being irradiated with light, featuring symmetrical volt-ampere characteristics with saturation areas, said apparatus further including a system of orthogonal electric buses, at the intersections of which the respective ones of said photosensitive cells are connected, said buses being individually connected to a voltage generator arranged so that at given moments it is adapted to feed voltage to said buses, rendering said cells light-responsive and light-irresponsive in groups distributed over the area of said matrix in accordance with a successive one of said two-dimensional functions of said set, whereby said matrix performs at the same time both masking and registration of the masked radiation, the sum total of the absolute values of the electric currents flowing through said cells being proportional to the integrated light flux of said image field for each said given two-dimensional masking function.

With the apparatus being arranged in the abovedescribed manner, the mask becomes combined with the photo-receivers of the matrix, and the masking rate is defined by the time of bringing the photo-receivers from a light-responsive state into a light-irresponsive state, and vice versa. In this way it has become possible to speed up both the mask changing and the switching over from one set of masks to another one, since in the herein disclosed apparatus the masking is controlled by electric signals exclusively.

It is advisable for said matrix to include a set of scanistors in the form of photosensitive semiconductor structures having *p-n* junctions in the form of strips, featuring the same effectiveness of separation of the minority current carriers produced upon said structure being irradiated with light, said strips lying in two respective planes parallel to that surface of said structure, upon which light is to fall in operation, those of said strips that are lying in either one of said two planes being geometrically parallel, electrically insulated from one another and orthogonal in respect of the strips of the *p-n* junctions lying in the other one of said planes, whereby there is formed in each area of intersection of said strips a three-layer structure featuring a symmetrical volt-ampere characteristic upon being irradiated with light, each said strip of *p-n* junctions being associated with an individual bus, the family of said buses forming said system of orthogonal buses connected to said voltage generator.

With the matrix being of the last-described structure, the structure of the apparatus, as a whole, is simplified by reduction of the number of electric connections between the members of the matrix, and that without increasing the size of the latter; it also becomes possible to improve the resolution of the matrix and to increase the degree to which the light-receiving area is filled with photosensitive cells.

Alternatively, the matrix may include a discrete scanistor including a plurality of photosenstive cells having each two *p-n* junctions featuring the same effectiveness of separation of the minority current carriers produced upon said photosensitive cells being irradiated with light, said *p-n* junctions being disposed on the external surface of said cells, symmetrically in respect of the base area that separates them, in a plane upon which light is to fall in operation of said apparatus, each one of said photosensitive cells being connected at the respective intersection of said system of orthogonal buses by the areas thereof, having the same type of conductivity.

With the matrix being of the above structure, it can be manufactured by relatively simple techniques, the matrix itself offering sufficiently high resolution.

According to yet another embodiment of the invention, said photosensitive cell of said matrix may include a five-layer semi-conductor structure having four *p-n* junctions of which the internal two are adpated to act alternatingly as collector ones, depending on the polarity of the voltage applied thereacross, said two junctions featuring the same effectiveness of separation of the minority current carriers produced upon said matrix being irradiated with light, the other two of said four junctions acting as emitter ones and providing for the presence of the volt-ampere characteristic of an area with a negative resistance, whereby said semiconductor structure is capable of memorizing information.

It is advisable that said means for optical reproduction of said image being analyzed should include a matrix of light-emitting injection diodes, each said light-emitting diode being secured to a respective one of said photo-sensitive cells, so that the light emitted thereby is received by the photosensitive surface of said respective cell.

The present invention will be further described in connection with several embodiments thereof, reference being had to the accompanying set of drawings, wherein.

Figure 1:
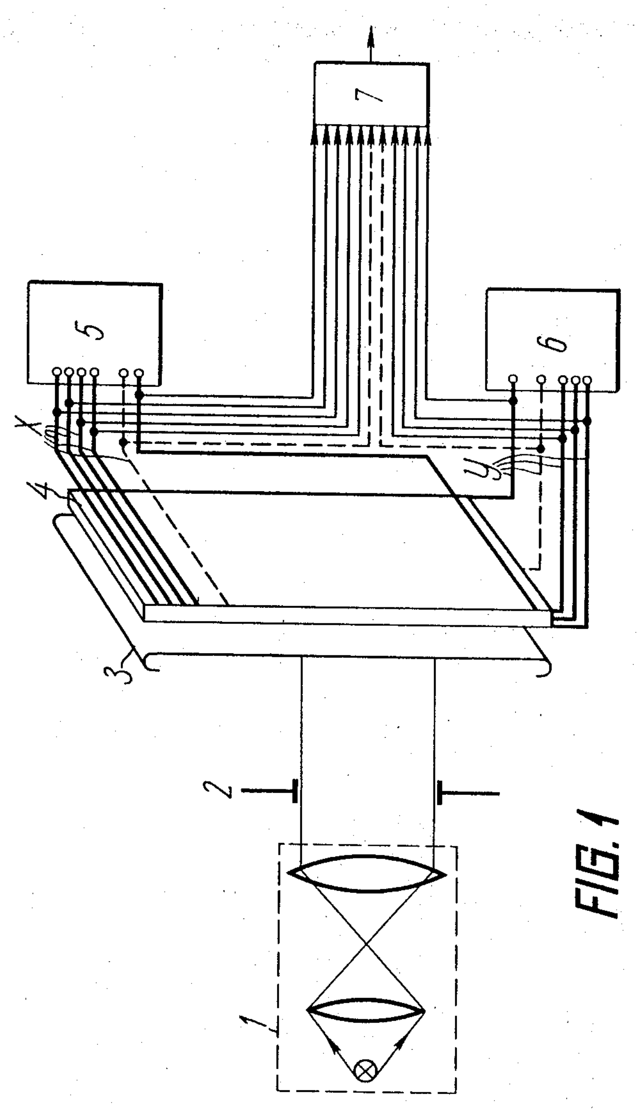
FIG. 1 is a block-unit diagram of an apparatus embodying the invention.

Referring now in particular to the appended drawings, the apparatus for analyzing an image comprises means for optical reproduction of the image, including an illumination source 1 (FIG. 1) with a diaphragm 2 and a holder 3 adapted to receive therein a film with the image to be analyzed, a matrix 4 of photocells (a photosensitive matrix), voltage generators 5 and 6 and an integrator 7 of the photoelectric currents of the photocells (not shown in FIG. 1). Each said photocell may be formed by a pair of photodiodes (not shown in FIG. 1) connected in opposition to each other. Both photodiodes should have their photosensitive surfaces facing the image being analyzed. The cells are supplied with electric power from the voltage generators 5 and 6 through a system of orthogonal horizontal and vertical buses X and Y, the photocells of the two photodiodes being connected at the intersections of these buses X and Y.

Figures 2, 3:
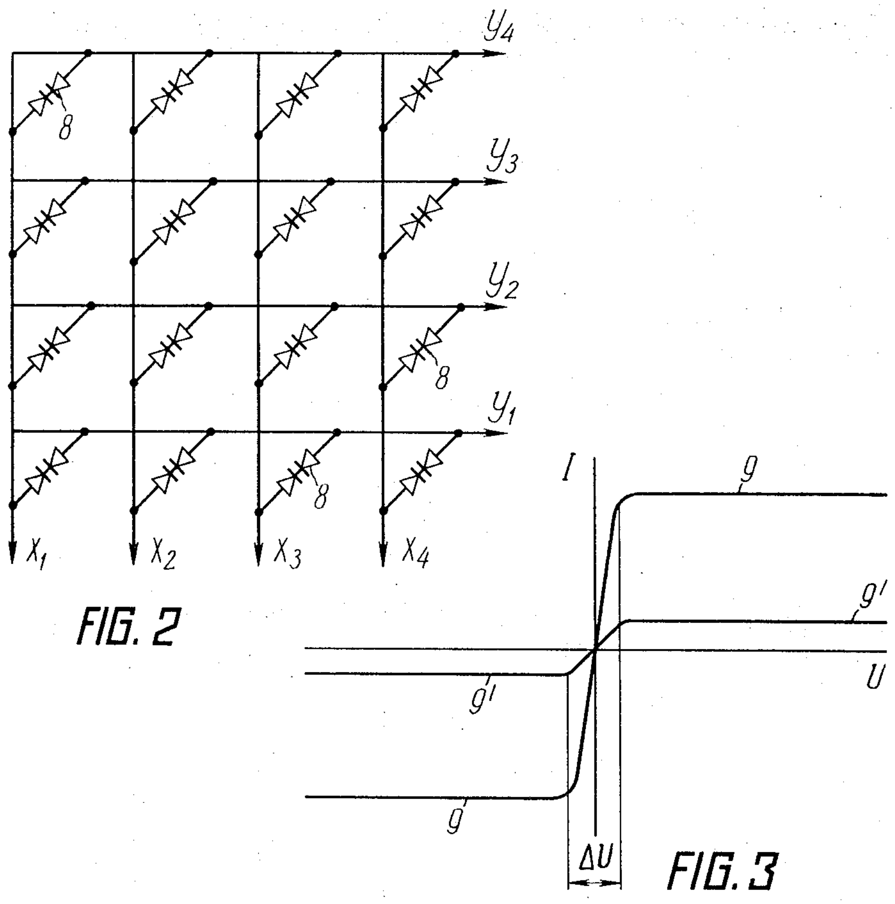
FIG. 2 is the volt-ampere characteristic of the photosensitive cell.
FIG. 3 is an equivalent electric connection diagram of the photosensitive matrix.

An equivalent diagram of the matrix 4 is illustrated in FIG. 2, wherein each photocell 8 is connected at the respective intersection. With the photodiodes having the same photosensitivity, these cells are bound to have a symmetrical volt-ampere characteristic with saturation areas. The expression "volt-ampere characteristic" in the present disclosure is meant as the family of curves expressing the current flowing through the cell as the function of the voltage at various values of illumination.

The symmetrical volt-ampere characteristic of the photocell is illustrated in FIG. 3 where the $y$-axis is graduated in current values, and the $x$-axis - in voltage values, the curve 9 corresponding to stronger illumination and the curve 9' - to weaker illumination.

The voltage generators 5 and 6 may be in the form of well-known multi-channel square pulse generators, each generator having the number of its outputs equal to the number of the buses connected thereto. Each generator 5 and 6 should have adjustable time intervals between successive electric pulses. The pulses put the buses at voltages rendering the photocells 8 light-responsive and light-irresponsive in groups distributed in space over the area of the matrix in accordance with a given masking law defined as a set of two-dimensional functions. By varying the polarity of the output voltages of the generators 5 and 6, it becomes thus possible to effect any desired combination of the distribution of the photocells 8 in said groups, and, consequently, to effect the masking of the image being analyzed in accordance with any desired law. Therefore, in the herein disclosed apparatus the mask is combined with the photo-receiving matrix, and rendering the photocells 8 selectively light-responsive and light-irresponsive corresponds to masking.

The input of the integrator 7 is so connected to all the X and Y buses that the integrator sums up the absolute values of photoelectric currents flowing through these buses from the photocells. Therefore, the electric output signal of the integrator 7 is proportional to the integral value of the light flux falling upon the group of the light-responsive cells and corresponds to the preset masking function, which means that this signal carries the desired information about the image being analyzed. The output signal of the integrator 7 may be fed, for example, to a computer for successive image identification, for filtering and other analytical operations. In some cases, however, mere registration of the output signal of the integrator 7 can do.

Let us now describe the operation of the herein disclosed apparatus when the latter transforms an image (not shown in the drawings) with use being made of two-dimensional Walsh functions.

Figure 4:
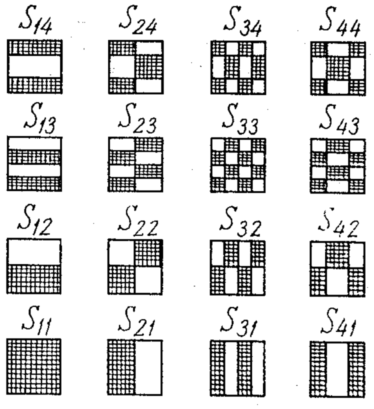
FIG. 4 is a graphic illustration of a system of two-dimensional Walsh functions.

The system of two-dimensional Walsh functions is graphically illustrated in FIG. 4. For the matrix to perform these functions, it is necessary that its masking should be such that the cells thereof would be rendered light-irresponsive at predetermined time intervals in groups corresponding in configuration to the dark areas of FIG. 4, the rest of the cells being light-responsive.

In the herein disclosed apparatus switching of the state of the cells is effected with the help of voltage generators 5 and 6 and a system of orthogonal buses X and Y.

Let us presume that at a starting point the voltage at every output of the generators 5 and 6 is the same and equals, e.g. $-U_o/2$, ($U_o$ being the bias voltage at the cells 8). Then the voltage drop at the intersections of the buses X and Y (FIG. 2) equals zero, and no current flow through the cells 8, whether they are lighted or not. This operational feature of the cells 8 is provided by their symmetrical volt-ampere characteristics relative to zero voltage. The abovedescribed state of the cells continues over a time interval $T_{11}$ (FIG. 5) and corresponds to the time of the existence of the first mask $S_{11}$, i.e., the state when the matrix is completely irresponsive to irradiation. Over the successive time interval $T_{12}$, which corresponds to the time of the existence of a mask $S_{12}$ the voltage supplied to buses X1, X2, X3, X4, Y3, Y4 is whereas the voltage supplied to buses Y1, Y2 is $+U_o/2 - U_o/2$, (therefore, the bias voltage at every intersection of the buses Y3 and Y4 with all the X buses equals zero, while the absolute value of the voltage drop at every intersection of the buses Y1 and Y2 with the X buses equals $U_o$). With the bias voltage being thus distributed, the lower half of the matric would not respond to light, whereas the upper part is light-responsive. Presuming that the darkened-state current ($i_s$) of the photodiodes is negligible in comparison with the illuminated-state one ($i_t$), we cannot but see that the current of the light-responsive diodes in each cell is proportional to the value of the light flux falling upon this cell at a given moment.

The currents come into the integrator 7 where they are totalized, whereby the integrator sends an electric output signal proportional to the sum total of the photoelectric currents of the cells 8 which are light-responsive in accordance with the mask $S_{12}$.

In this way there is obtained one of the features, namely, the coefficient $C_{12}$ which is characteristic of the image.

Let us now consider a time interval $T_{22}$ corresponding to the mask $S_{22}$. The output voltages of the generators 5 and 6 are such that the bias at the cells 8 connected at the intersections of the buses XI and Y3, X2 and Y4, X3 and Y1, X4 and Y2 equals zero, the bias at the cells at the intersections X1 and Y1, X2 and Y2 is $+U_o$, and the bias at the cells 8 at the intersections of the buses X3 and Y3, X4 and Y4 equals $-U_o$. Therefore, when the cells with the $+U_o$ bias are illuminated, the currents in the corresponding buses are equal to $+i_t$, whereas the currents corresponding to the illuminated cells with the $-U_o$ bias are equal to $-i_t$. The currents are supplied to the integrator 7 where their absolute values are totalized, whereby there appears at the output of the integrator 7 an electric signal that is proportional to the sum total of the photoelectric currents generated by those of the illuminated cells 8 which are light-responsive in configuration corresponding to the mask $S_{22}$.

Therefore, another feature is obtained, namely, the coefficient $C_{22}$ which is further characteristic of the image.

Figure 5:
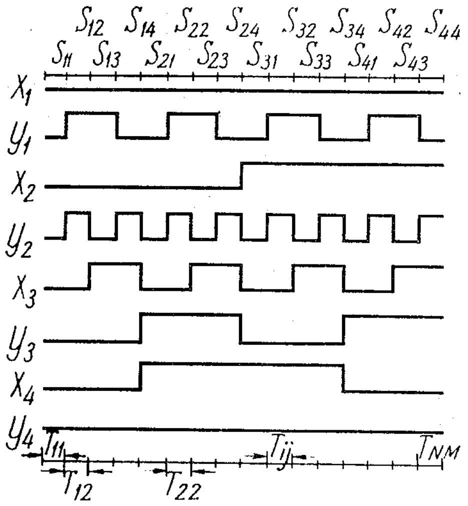
FIG. 5 is a time-related diagram of voltages fed to the system of orthogonal buses, in order to perform masking of the image in accordance with the system of Walsh functions

With the buses being switched in succession within a time interval $\|T_{ij}\|$, as it is shown in voltage diagrams in FIG. 5, there is obtained a complete set of masks $\| S_{ij} \|$ and, consequently, a complete set of coefficients $\|C_{ij}\|$. ($i = 1, 2, 3 \ldots M$; $j = 1, 2, 3 \ldots N$, where M is the number of the members of the matrix in the horizontal direction and N is the number of the members of the matrix in the vertical direction).

The set of coefficients $C_{ij}$ unambiguously characterizes the image with accuracy defined by the dimension of the matrix MN and is an outcome of the image having been decomposed into a three-dimensional spectrum by the orthogonal Walsh functions.

The decomposition is effected within a time $T_k$ equal to $T_{ij}$·N·M. The selection of the minimal time $T_{ij}$ depends on the swiftness of the action of the light-responsive members, since when a photodiode is switched from negative bias to positive bias, the life-time of the minority carriers in the base area of the semiconductor device becomes essential, which life-time might be blow $10^{-7}$ seconds, and, correspondingly, the time of obtaining a single coefficient is about $10^{-7}$, independently of the M·N value.

When two-gradation masks are formed, the value of $U_o$, as it is defined by the volt-ampere characteristic, should be above $\Delta U/2$ , and $\Delta U = 4kT°/q$, where T° is temperature in °C, $q$ - the charge of an electron and k - Boltzmann's constant.

In principle, the decomposition may be effected by any orthogonal function, including those which are not in a binary code; it may be effected, e.g., by trigonometric "exp (jwt)" functions. In this case the range of working voltages for the masking operation should be within the ΔU (FIG. 3) range; it is further possible to step up this range artificially to several volts by serially connecting an ohmic resistor into every cell.

There has been described hereinabove a photosensitive matrix of which the cells are formed by a pair of photodiodes connected in opposition to each other. In some cases such a matrix has disadvantages arising from its relatively low resolution, considerable size of the matrix, as a whole, incomplete utilization of the total area of the matrix.

Figure 6:
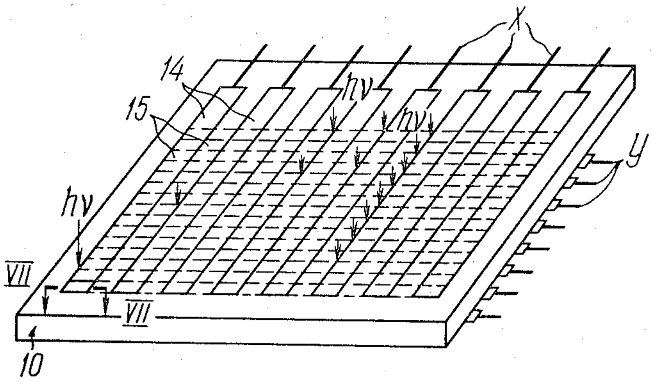
FIG. 6 is the photosensitive cell in the form of a scanistor.
Figure 7:
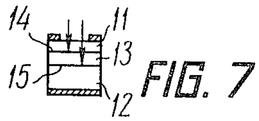
FIG. 7 is a cross-sectional view taken along line VII—VII of FIG. 6.

These disadvantages can be minimized by employing a matrix including a set of scanistors (FIG. 6) made on a semiconductor panel 10, e.g., on an *n*-type conductivity silicon panel. A material, e.g., boron has been diffused into the opposite sides of a panel 10 to form *p*-type conductivity layers 11 and 12 (FIG. 7) sandwiching therebetween an *n*-type conductivity layer 13. The *p*-type layers 11 and 12 should be so positioned that the *p-n* junctions 14 and 15 formed would be shaped as strips lying in planes parallel to that side of the panel upon which irradiation ($h\,v$) shown by arrow lines is to fall, the *p-n* junctions lying in the same planes being parallel geometrically and electrically insulated from one another. Electric insulation of the strips of the *p-n* junctions is effected by artificial reduction of the life-time of the minority carriers in the layer 13 by introducing a small amount of gold, in which way spacing between the strips lying in the same plane can be made as small as several microns.

The *p-n* junction strips lying in different planes are orthogonal relative to one another. Therefore, at the intersection of the strips there is formed a three-layer *p-n-p* structure (FIG. 7), wherein the *p*-type layer 11 is characterized by small absorption of light of a given wavelength.

Symmetry of the volt-ampere characteristic of the three-layer structure is provided by the ratio of the depths of the junctions 14 and 15 in the body of the device. For a given wavelength the ratio of these depths is selected so that both *p-n* junctions 14 and 15 should feature the same effectiveness of separation of the minority current carriers, appearing when the matrix is irradiated with light, i.e., separation of the minority carriers should be effected to the same degree by both *p-n* junctions 14 and 15 when bias voltage is applied thereacross.

Each strip of the *p-n* junctions is provided with its own bus $X_i$ and $Y_i$, the family of the buses making up a system of orthogonal buses.

Each said three-layer structure is a photocell of the matrix and corresponds, in fact, to a pair of oppositely connected photodiodes, wherefore its connection diagram is similar to that described hereinabove in connection with FIG. 2.

With all the cells formed on a single panel, they have a common base area. In order to prevent connection between the cells through this common base area, the latter is made with high ohmic resistance, e.g., if the entire structure is formed on a silicon panel 10, the base area 13 can be alloyed with gold, in order to compensate for minor impurities and to attain specific resistance that should be close to the natural resistance. In this distributed-parameter system the size of an elementary cell is defined by the length of the diffusion displacement of the current carriers originated by light and by the depths of the *p-n* junctions 14 and 15. This size can be within 100 microns by 100 microns. The width of the strip of *p-n* junctions and the spacing therebetween depend on the photolithography technique employed and can be about 100 microns and smaller, as small as several microns.

The operation of the last-described matrix is similar to that of the previously described matrix.

Figure 8:
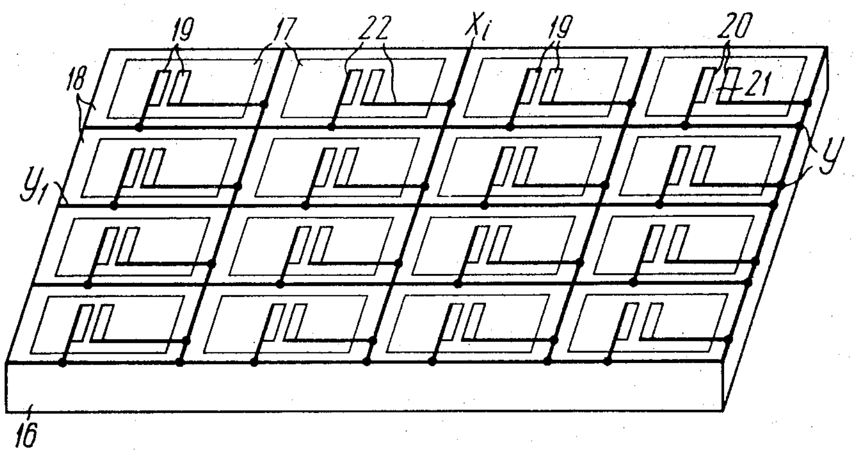
FIG. 8 is the matrix in the form of a discrete scanistor.

According to still another embodiment of the present invention, the photosensitive matrix can be in the form of a discrete scanistor made on an *n*-type silicon panel 16 (FIG. 8) with reduced lifetime of minority carriers. The external surface of this panel has formed thereon by diffusion of phosphorus $n^+$-type conductivity areas 17 of either rectangular or more complicated shape, the areas being insulated from one another by the areas 18 of the basic material. Each such $n^+$-type area has formed therein a pair of *p*-type areas 19, so that the $p$-$n^+$ junctions are directly on the external surface of the panel 16, which surface should be facing light in operation. These *p*-type areas 19 should be disposed symmetrically in respect of the $n^+$-type area 21 that separates them, the area 21 thus acting as the base. The edges of the *p*-type areas, facing each other, should be spaced by a distance not in excess of the diffusion displacement of the carriers in the $n^+$-type area.

Thus, there is formed a structure which is basically equivalent to the abovedescribed three-layer structure.

In operation of the last-described matrix, it is essential that the conditions should be such that the light flux should fall mainly upon the base area 21, in which way the minority carriers would be separated to the same degree by the two *p-n* junctions 20, whereby the cell would display symmetrical volt-ampere characteristic, when illuminated.

The *n*-type areas 18 which separate electrically the photocells have gold atomized thereupon to form a system of orthogonal buses X and Y which are insulated from one another at the intersection points. The *p*-type areas of each cell are connected to the respective intersection of said system by electrodes 22. The buses are connected to voltage generators (not shown in the drawings).

The connection diagram of the last-described matrix is similar to that illustrated in FIG. 2, the operation of the matrix being similar to that described hereinabove.

When a matrix based on the discrete scanistor is employed, it is advisable to employ a matrix including light-emitting injection diodes (not shown in the drawings), as the means for optical reproduction of the image being analyzed. Each such light-emitting diode is bonded into the base of the respective photocell, whereby there is ensured both the symmetry of the volt-ampere characteristic and full utilization of the light flux.

In cases when, in addition to masking and conversion of the light flux into electric signals, it is necessary to memorize the optical image, there are employed for the photoreceiving cells five-layer photosensitive structures known in the art as photosimistors, the latter having a symmetrical volt-ampere characteristic with saturation areas and negative reverse resistance. This volt-ampere characteristic makes it possible to effect two discrete states at each branch of the volt-ampere characteristic, namely, the "on" and "off" states of which the first corresponds to the light-responsive state of the cells and the second - to the light-irresponsive state thereof. Therefore, when in the light-responsive state, all the cells operate similarly, irrespective of the value of the light flux incident thereupon, whereby the requirements as to the symmetry of the volt-ampere characteristics of different cells can be less strict.

A photosimistor 23 (FIG. 9) is a five-layer structure based on *n*-type silicon, the structure having alternating *n-p-n-p-n* -type layers 24, 25, 26, 27 and 28. The internal *p-n* junctions 29 and 30 are alternatingly either of the collector type or of the emitter type, depending on the polarity of the voltage applied thereacross. These junctions, when closed, feature the same effectiveness of separation of the minority current curriers produced by irradiation with light.

Figure 10:
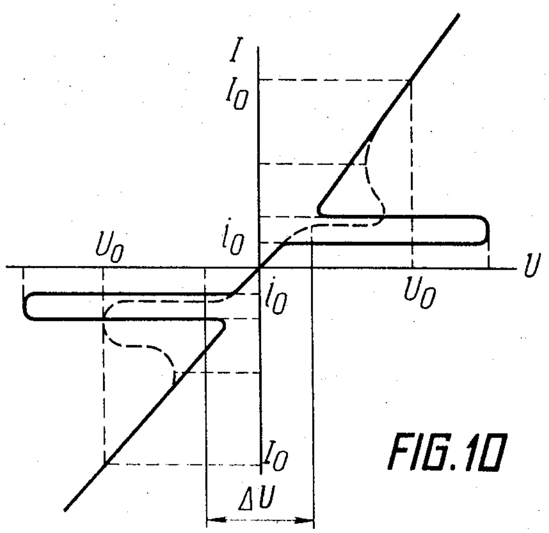
FIG. 10 illustrates the volt-ampere characteristic of the photosimistor.

As is known, the last-described structure provides for the presence of negative reverse resistance areas in the volt-ampere characteristic, owing to the existence of external emitter-type junctions 31 and 32. The volt-ampere characteristic of the photosimistor is illustrated in FIG. 10. The characteristic has a $\Delta U = 4kT/q$ area defining the zone of insensitivity, two saturation areas (the solid line in the drawing shows the saturation area in the absence of a light flux, while the dotted line shows these areas in the presence of light) and two forward current rising areas. When supplied with voltage equaling $\pm U_o/2$ , i.e. voltage corresponding to bringing the cell into the light-responsive state, in the absence of light, the current flowing through the structure corresponds to the saturation area in the volt-ampere characteristic, i.e., to $i_o$. When the same voltage is applied in the presence of light, there is a current $I_o >> i_o$ flowing through the structure, this current not depending, as it is known, on the intensity of the light flux and depending solely on the value of the voltage supplied. Since the volt-ampere characteristic has the negative resistance area, it can be seen that after the illumination has been discontinued, the flow of current $I_o$ continues until the bias voltage is cut off. In this way the information is memorized. The value of $I_o$ being independent of the intensity of the light flux, the requirements as to the symmetry of the volt-ampere characteristic of the cell can be less strict, as it has been already mentioned hereinabove.

Figure 9:
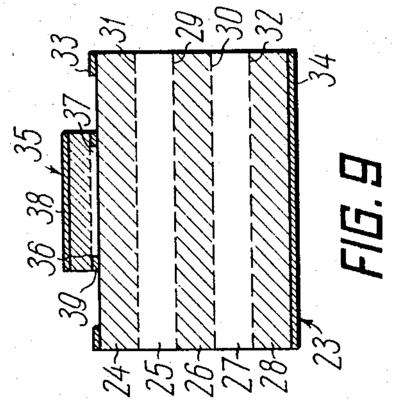
FIG. 9 is a five-layer photosensitive structure (a photosimistor)

The external layers 24 and 25 which in operation of the herein disclosed apparatus should be facing the image being analyzed are of low light absorbency in respect of light of a given wavelength. The photosimistor is to be electrically connected at the respective intersection of the system of the orthogonal buses by the external areas of the same type of conductivity, through a pair of ohmic contacts 33 and 34. The employment of a photosimistor in the herein disclosed apparatus further simplifies the means for optical reproduction of the image being analyzed, which in the presently disclosed embodiment may be in the form of a matrix of light-irradiating members, e.g., of light-emitting injection diodes. In this case each light-emitting diode 35 is bonded to the photosimistor. The light-emitting diode includes *p*-type and *n*-type layers 36 and 37 associated with ohmic contacts 38 and 39, respectively, as shown in FIG. 9. The matrix of the light-emitting diodes has its own system of orthogonal buses, the light-emitting diodes being connected at the intersections of these buses. With voltage being supplied to the buses, the light-emitting matrix forms an illuminated image which is the image to be analyzed.

Figure 11:
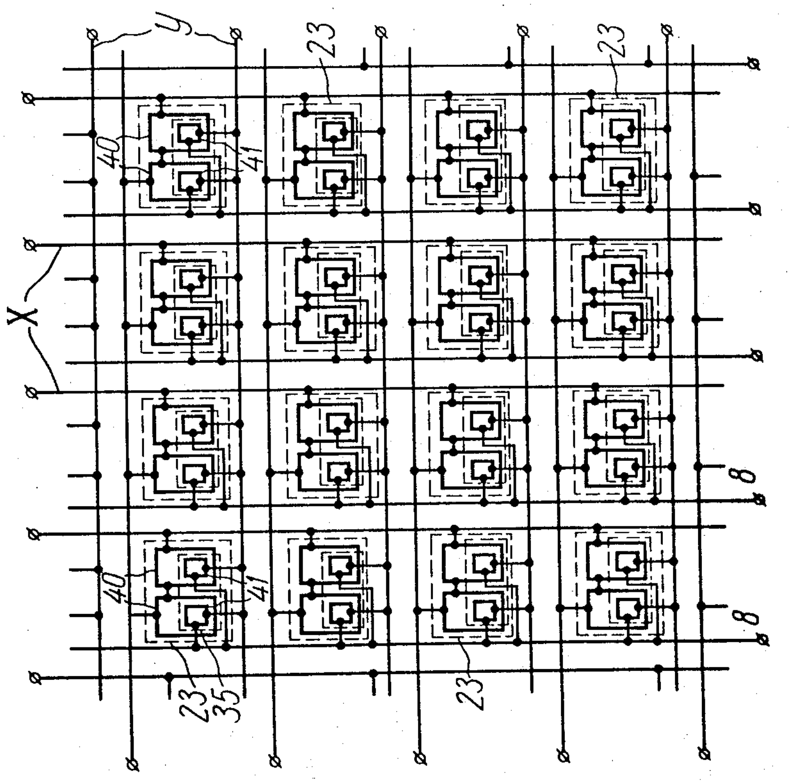
FIG. 11 is an equivalent electric diagram of connection of the photosimistors to the system of buses.

An equivalent diagram of electric connection of the photosimistors to a system of buses is illustrated in FIG. 11, wherein each photosimistor 23 is in the form of a pair of oppositely parallel connected photothyristors 40; the same FIG. 11 further illustrates an equivalent diagram of electric connection of the matrix of light-emitting diodes, wherein each light-emitting diode 35 is in the form of a pair of serially connected light-emitting diodes 41.

Let us now discuss how coefficients belonging to a Fourier's series are formed when an image is being analyzed.

Let us presume that there is an electric signal fed to the buses of the light-emitting matrix, the signal producing an illuminated image of a required configuration during a time interval $T_{11}$. During this interval a mask $S_{11}$ is generated over the photo-receiving matrix. During the successive interval $T_{12}$ the same illuminated image is formed, the image corresponding to the signal being analyzed, but a different mask $S_{12}$ is generated over the photo-receiving matrix, as it has been previously described, and so on.

Each cell of the presently described structure operating as it has been explained hereinabove, the outcome of each masking step can be memorized by the matrix.

The value of current $I_o$ being independent of the value of the light flux, the accuracy of determination of the coefficients C is stepped up, each said coefficient being a sum total of the absolute values of the currents through the illuminated cells in the light-responsive areas of the mask.

The employment of the present invention makes it possible, when using matrices with 256 × 256 members, to obtain 256 × 256 coefficients of an image expansion into Fourier series in 0.05 to 0.06 seconds, whereas with the employment of fast algorithms it takes 2 to 4 minutes for a computer to expand an image into a Fourier series. The photosensitive matrix can be formed as a single monocrystal and can be as small as 0.1 × 0.1 cm, in which way the overall dimensions of the apparatus, as a whole, can be substantially reduced, particularly when a matrix of light-emitting diodes is employed as the means of optical reproduction of the image being analyzed.

What we claim is:

1. An apparatus for analyzing the shape of an image, comprising: means for optical reproduction of an image being analyzed, adapted to irradiate light which, in the process of an analysis, is masked at given time intervals in accordance with a given law expressed as a set of two-dimensional functions; a matrix of photosensitive cells displaying, when irradiated with light, symmetric volt-ampere characteristics including saturation areas; a system of orthogonal buses, said photosensitive cells of said matrix being connected at the respective intersections of said orthogonal buses; a voltage generator having connected individually to the output thereof said buses of said system, said voltage generator being such that at said given time intervals there is supplied such a voltage pattern to said buses, which renders said cells into light-responsive and light-irresponsive state in groups distributed over the area of said matrix in accordance with a successive one of said two-dimensional functions of said set, whereby said matrix effects simultaneously both the masking and registration of the masked light flux, the arrangement being such that there is a sum total of the absolute values of the electric currents flowing through said cells, which is proportional to the intergral light flux of the image field for each said given two-dimensional masking function, said sum total carrying information representative of the shape of said image.

2. An apparatus as claimed in claim 1, wherein said matrix includes a set of scanistors in the form of a photosensitive semiconductor structure having *p-n* junctions in the form of strips, featuring the same effectiveness of separation of the minority current carriers produced upon said structure being irradiated with light, said strips lying in two respective planes parallel to that surface of said structure, upon which light is to fall in operation, those of said strips that are lying in the same plane being geometrically parallel, electrically insulated from one another and orthogonal in respect of the strips of the *p-n* junctions of the other one of said planes, whereby there is formed in the areas of intersection of said strips a three-layer structure featuring a symmetrical volt-ampere characteristic upon being irradiated with light, each said strip of *p-n* junctions being associated with an individual bus, the family of said buses forming said system of orthogonal buses connected to said voltage generator.

3. An apparatus as claimed in claim 1, wherein said matrix includes a discrete scanistor including a plurality of photosensitive cells having each two *p-n* junctions featuring the same effectiveness of separation of the minority current carriers produced upon said photosensitive cells being irradiated with light, said *p-n* junctions being disposed on the external surface of said cells, symmetrically in respect of the base area which separates them, in a plane upon which light is incident in operation of said apparatus, each one of said photosensitive cells being connected at the respective intersection of said system of orthogonal buses by the areas thereof, having the same type of conductivity.

4. An apparatus as claimed in claim 1, wherein said photosensitive cell of said matrix includes a five-layer semiconductor structure having four *p-n* junctions of which the internal two are adapted to act alternatingly as collector ones, depending on the polarity of the voltage applied thereacross, said two junctions featuring the same effectiveness of separation of the minority current carriers produced upon said matrix being irradiated with light, the other two of said four junctions acting as emitter ones and providing for the presence in the volt-ampere characteristic of an area with negative resistance, whereby said semi-conductor structure is capable of memorizing information.

5. An apparatus as claimed in claim 3, wherein said means for optical reproduction of said image being analyzed includes a matrix of injection light-emitting diodes, each said light-emitting diode being secured to a respective one of said photosensitive cells, so that the light emitted thereby is received by the photosensitive surface of said respective cell.

6. An apparatus as claimed in claim 4, wherein said means for optical reproduction of said image being analyzed includes a matrix of injection light-emitting diodes, each said light-emitting diode being secured to a respective one of said photosensitive cells, so that the light emitted thereby is received by the photosensitive surface of said cell.

* * * * *